US011023783B2

(12) United States Patent
Wong

(10) Patent No.: US 11,023,783 B2
(45) Date of Patent: Jun. 1, 2021

(54) NETWORK ARCHITECTURE SEARCH WITH GLOBAL OPTIMIZATION

(71) Applicant: INTERNATIONAL BUSINESS MACHINES CORPORATION, Hartland, WI (US)

(72) Inventor: Chun Lok Wong, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 77 days.

(21) Appl. No.: 16/567,566

(22) Filed: Sep. 11, 2019

(65) Prior Publication Data
US 2021/0073588 A1    Mar. 11, 2021

(51) Int. Cl.
*G06K 9/62*    (2006.01)
*G06N 3/08*    (2006.01)
(Continued)

(52) U.S. Cl.
CPC ......... *G06K 9/6262* (2013.01); *G06K 9/6256* (2013.01); *G06N 3/04* (2013.01);
(Continued)

(58) Field of Classification Search
CPC ..... G06K 9/6256–6262; G06K 9/4628; G06K 9/627; G06K 9/6271; G06K 9/3233;
(Continued)

(56) References Cited

U.S. PATENT DOCUMENTS 8,370,282 B1 * 2/2013 Leung ................... G06F 16/583
706/20
9,552,549 B1 * 1/2017 Gong ................... G06N 3/0454
(Continued)

FOREIGN PATENT DOCUMENTS

WO    2007117506 A3    2/2009

OTHER PUBLICATIONS

Kim et al., "Scalable Neural Architecture Search for 3D Medical Image Segmentation", MIDL 2019. https://openreview.net/pdf?id=S1lhkdKkeV.
(Continued)

*Primary Examiner* — Michael S Osinski
(74) *Attorney, Agent, or Firm* — Michael Best & Friedrich LLP

(57) ABSTRACT

Systems and methods generate a segmentation network for image segmentation using global optimization. A method for automatic generation of at least one segmentation network includes providing an initial set of hyperparameters to construct a segmentation network. The hyperparameters define operations for a set of block structures and connections between the block structures. The segmentation network is trained using a first set of images with ground truth. An objective function value for the trained segmentation network is generated using a second set of images having ground truth. The set of hyperparameters is updated by performing a derivative-free optimization algorithm on the objective function value to construct an updated segmentation network. The training of the segmentation network, the generating of the objective function, and the updating of the set of hyperparameters for the updated segmentation network are iterated to generate a network architecture for the segmentation network.

20 Claims, 4 Drawing Sheets

(51) Int. Cl.
*G06N 3/04* (2006.01)
*G06T 7/11* (2017.01)

(52) U.S. Cl.
CPC .................. *G06N 3/08* (2013.01); *G06T 7/11* (2017.01); *G06T 2207/20081* (2013.01)

(58) Field of Classification Search
CPC ...... G06K 9/3241; G06K 9/42; G06K 9/6215; G06K 9/6228; G06K 9/6255; G06K 9/6267; G06T 7/11; G06T 2207/20081; G06T 2207/20084; G06T 3/4046; G06T 3/4053; G06N 3/04–088
See application file for complete search history.

(56) References Cited

U.S. PATENT DOCUMENTS

| | | |
|---|---|---|
| 9,668,699 B2 | 6/2017 | Georgescu et al. |
| 9,792,531 B2 | 10/2017 | Georgescu et al. |
| 10,504,027 B1* | 12/2019 | Kim ..................... G06K 9/78 |
| 10,509,987 B1* | 12/2019 | Kim ..................... G06K 9/627 |
| 2015/0379430 A1 | 12/2015 | Dirac et al. |
| 2017/0032189 A1* | 2/2017 | Zhang ................. G06K 9/00718 |
| 2017/0220904 A1* | 8/2017 | Bai ....................... G06K 9/4604 |
| 2017/0337682 A1 | 11/2017 | Liao et al. |
| 2017/0364796 A1 | 12/2017 | Wiebe et al. |
| 2018/0033144 A1 | 2/2018 | Risman et al. |
| 2018/0165546 A1* | 6/2018 | Skans ................... G06K 9/6234 |
| 2019/0080240 A1 | 3/2019 | Andoni et al. |
| 2019/0138838 A1* | 5/2019 | Liu ....................... G06T 5/002 |
| 2019/0220746 A1* | 7/2019 | Liu ....................... G06N 3/08 |
| 2019/0220977 A1* | 7/2019 | Zhou .................... G06T 5/50 |
| 2019/0355103 A1* | 11/2019 | Baek ..................... G06T 5/005 |
| 2019/0377979 A1* | 12/2019 | Jiang ................... G06N 3/0454 |
| 2020/0026951 A1 | 1/2020 | Chowdhury et al. |
| 2020/0134375 A1* | 4/2020 | Zhan .................... G06K 9/6259 |
| 2020/0134444 A1* | 4/2020 | Chen .................... G06N 3/0454 |
| 2020/0234135 A1* | 7/2020 | Kim ..................... G06F 17/15 |
| 2020/0257983 A1* | 8/2020 | Tachibana ............ G06K 9/6262 |
| 2020/0327675 A1* | 10/2020 | Lin ...................... G06T 7/194 |
| 2020/0342328 A1* | 10/2020 | Revaud ................ G06F 17/15 |
| 2020/0342572 A1* | 10/2020 | Chen .................... G06T 3/4046 |
| 2020/0342643 A1* | 10/2020 | Gouws .................. G06N 3/04 |
| 2020/0349444 A1* | 11/2020 | Yaguchi ................ G06N 3/08 |
| 2020/0364500 A1* | 11/2020 | Huang .................. G06T 5/00 |
| 2020/0380362 A1* | 12/2020 | Cao ...................... G06N 3/04 |
| 2021/0012136 A1* | 1/2021 | Zhang .................. G06K 9/3233 |
| 2021/0012189 A1* | 1/2021 | Wang ................... G06F 17/13 |

OTHER PUBLICATIONS

Cicek, O. et al, "3D U-Net: Learning Dense Volumetric Segmentation from Sparse Annotation", Computer Science Department, University of Freiburg, Germany, BIOSS Centre for Biological Signalling Studies, Jun. 21, 2016, Freiburg, Germany, University Hospital Freiburg, Renal Division, Faculty of Medicine, University of Freiburg, Germany, Department of Psychiatry and Psychotherapy, University Medical Center Freiburg, Germany, Google DeepMind, London, UK.

Liu, H. et al., "DARTS: Differentiable Architecture Search", Jun. 24, 2018.

Milletari, F. et al., "V-Net: Fully Convolutional Neural Networks for Volumetric Medical Image Segmentation", Computer Aided Medical Procedures, Jun. 15, 2016, Computer Aided Medical Procedures, Johns Hopkins University, Baltimore, USA Department of Neurology, Klinikum Grosshadern, Germany.

Mortazi, A. et al., "Automatically Designing CNN Architectures for Medical Image Segmentation", Center for Research in Computer Vision (CRCV), Jul. 19, 2018, University of Central Florida, Orlando, FL, US.

Zhong, Zhao et al., "Practical Block-wise Neural Network Architecture Generation", National Laboratory of Pattern Recognition, May 14, 2018, Institute of Automation, Chinese Academy of Sciences, SenseTime Research, University of Chinese Academy of Sciences, CAS Center for Excellence of Brain Science and Intelligence Technology.

Zoph, B. et al, "Neural Architecture Search With Reinforcement Learning", Under review as a conference paper at ICLR 2017, Feb. 15, 2017.

United States Patent Office Action for U.S. Appl. No. 16/567,573 dated Jul. 9, 2020 (10 pages).

United States Patent Office Notice of Allowance for U.S. Appl. No. 16/567,573 dated Oct. 26, 2020 (7 pages).

Sep. 11, 2019, U.S. Appl. No. 16/567,566.

Sep. 11, 2019, U.S. Appl. No. 16/567,573.

* cited by examiner

NETWORK ARCHITECTURE SEARCH WITH GLOBAL OPTIMIZATION

FIELD OF DISCLOSURE

Embodiments described herein relate to deep learning architectures. More particularly, embodiments described herein relate to systems and methods for generating a segmentation network for image segmentation using global optimization.

SUMMARY

Deep learning techniques have largely reduced the need for manual feature selection in image segmentation. However, days to weeks are still required to manually search for the appropriate network architectures and hyperparameters that define the block structures of the network and the interconnections between them. Network architecture search (NAS) is a method for automatically generating a network architecture to reduce human workload. NAS is difficult to implement for segmentation of 3D images due to the computational requirements and the presence of local optima. Accordingly, embodiments described herein are directed to generating a network architecture using global optimization. In some embodiments, a derivative-free global optimization is performed. In some embodiments, out-of-memory conditions are factored into the global optimization. In some embodiments, illegal block structures are factored into the global optimization.

In particular, embodiments described herein provide systems and methods for generating a segmentation network for image segmentation using global optimization.

In one embodiment, a method for automatic generation of at least one segmentation network includes providing an initial set of hyperparameters to construct a segmentation network. The hyperparameters define operations for a set of block structures and connections between the block structures. The segmentation network is trained using a first set of images with ground truth. An objective function value for the trained segmentation network is generated using a second set of images having ground truth. The set of hyperparameters is updated by performing a derivative-free optimization algorithm on the objective function value to construct an updated segmentation network. The training of the segmentation network, the generating of the objective function, and the updating of the set of hyperparameters for the updated segmentation network are iterated to generate a network architecture for the segmentation network.

In another embodiment, a system includes an electronic processor and memory storing instructions that, when executed by the electronic processor, cause the system to provide an initial set of hyperparameters to construct a segmentation network. The hyperparameters define operations for a set of block structures and connections between the block structures. The segmentation network is trained using a first set of images with ground truth. An objective function value for the trained segmentation network is generated using a second set of images having ground truth. The set of hyperparameters is updated by performing a derivative-free optimization algorithm on the objective function value to construct an updated segmentation network. The training of the segmentation network, the generating of the objective function, and the updating of the set of hyperparameters for the updated segmentation network are iterated to generate a network architecture for the segmentation network.

A further embodiment provides non-transitory computer-readable medium including instructions that, when executed by an electronic processor, perform a set of functions. The set of functions includes providing an initial set of hyperparameters to construct a segmentation network. The hyperparameters define operations for a set of block structures and connections between the block structures. The segmentation network is trained using a first set of images with ground truth. An objective function value for the trained segmentation network is generated using a second set of images having ground truth. The set of hyperparameters is updated by performing a derivative-free optimization algorithm on the objective function value to construct an updated segmentation network. The training of the segmentation network, the generating of the objective function, and the updating of the set of hyperparameters for the updated segmentation network are iterated to generate a network architecture for the segmentation network.

In one embodiment, a method for automatic generation of at least one segmentation network includes providing an initial set of hyperparameters to construct a segmentation network. The hyperparameters define operations for a set of block structures and connections between the block structures. Generating the objective function includes setting the objective function to a predetermined value responsive to identifying an untrainable condition of the trained initial segmentation network. The segmentation network is trained using a first set of images with ground truth. An objective function value for the trained segmentation network is generated using a second set of images having ground truth. The set of hyperparameters is updated by performing an optimization algorithm on the objective function value to construct an updated segmentation network. The training of the segmentation network, the generating of the objective function, and the updating of the set of hyperparameters for the updated segmentation network are iterated to generate a network architecture for the segmentation network.

In another embodiment, a system includes an electronic processor and memory storing instructions that, when executed by the electronic processor, cause the system to provide an initial set of hyperparameters to construct a segmentation network. The hyperparameters define operations for a set of block structures and connections between the block structures. Generating the objective function includes setting the objective function to a predetermined value responsive to identifying an untrainable condition of the trained initial segmentation network. The segmentation network is trained using a first set of images with ground truth. An objective function value for the trained segmentation network is generated using a second set of images having ground truth. The set of hyperparameters is updated by performing an optimization algorithm on the objective function value to construct an updated segmentation network. The training of the segmentation network, the generating of the objective function, and the updating of the set of hyperparameters for the updated segmentation network are iterated to generate a network architecture for the segmentation network.

A further embodiment provides non-transitory computer-readable medium including instructions that, when executed by an electronic processor, perform a set of functions. The set of functions includes providing an initial set of hyperparameters to construct a segmentation network. The hyperparameters define operations for a set of block structures and connections between the block structures. The segmentation network is trained using a first set of images with ground truth. An objective function value for the trained segmentation network is generated using a second set of images having ground truth. The set of hyperparameters is updated by performing a derivative-free optimization algorithm on the objective function value to construct an updated segmentation network. The training of the segmentation network, the generating of the objective function, and the updating of the set of hyperparameters for the updated segmentation network are iterated to generate a network architecture for the segmentation network.

Other aspects of the disclosure will become apparent by consideration of the detailed description and accompanying drawings.

DETAILED DESCRIPTION

Figure 1:
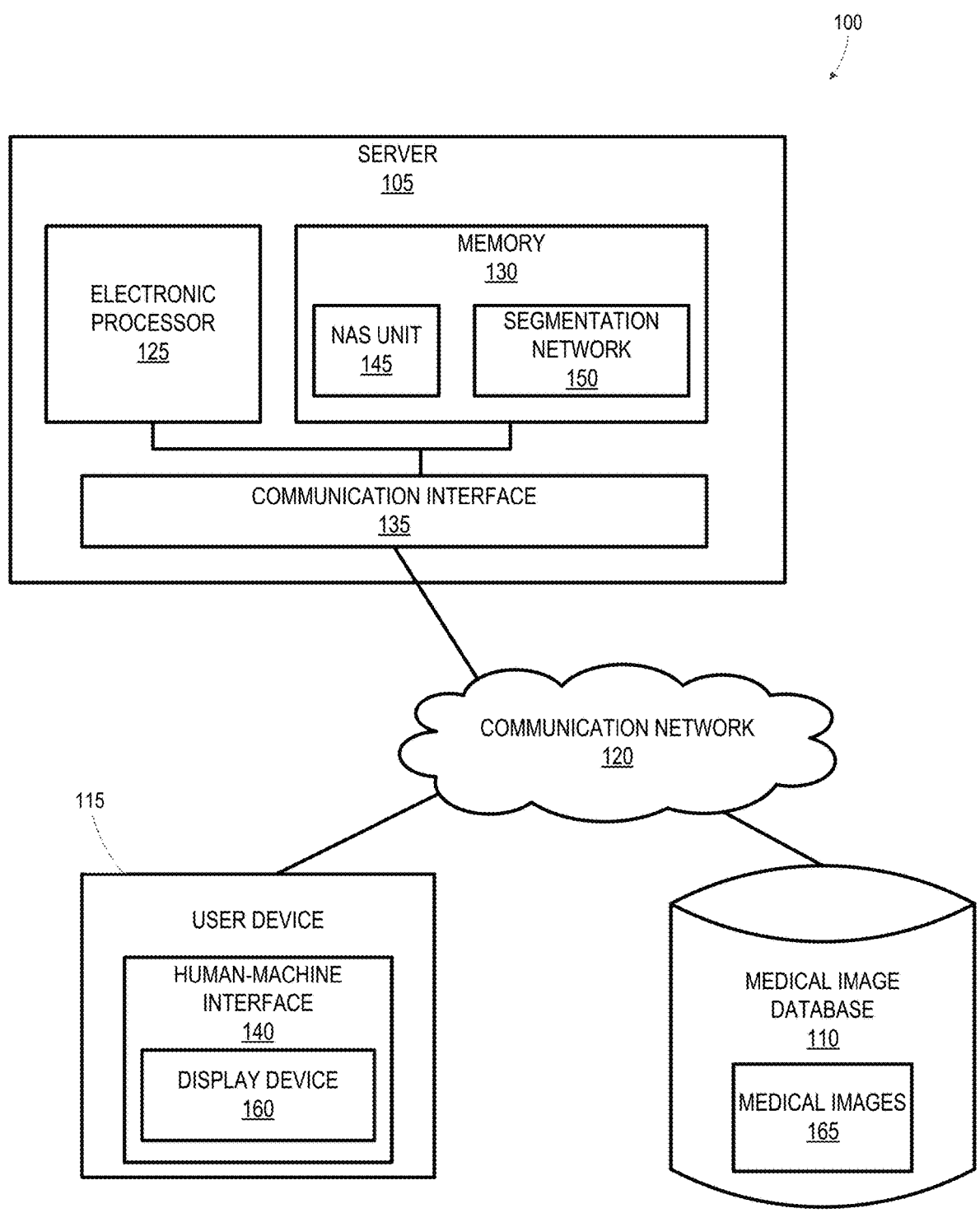
FIG. 1 illustrates an example system for generating a segmentation network for image segmentation using global optimization according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Also, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Example systems and methods disclosed and contemplated herein relate to generating a network architecture for image segmentation. Although the following description focuses on image segmentation in a medical context, it will be appreciated that various systems, methods, and techniques disclosed herein are applicable to other domains, such as autonomous vehicles. For example, with the autonomous vehicle space, images may be segmented to identify a road center line, a stop sign, or other findings of interested similar to findings of interest in medical images.

As noted above, network architecture search (NAS) is difficult to implement for segmentation of 3D images due to the computational requirements and the presence of local optima. Accordingly, embodiments described herein are directed to generating a network architecture using global optimization. In some embodiments, a derivative-free global optimization is performed. In some embodiments, out-of-memory conditions are factored into the global optimization. In some embodiments, illegal block structures are factored into the global optimization.

FIG. 1 illustrates a system 100 for generating a network architecture according to some embodiments. The system 100 includes a server 105, a medical image database 110, and a user device 115. In some embodiments, the system 100 includes fewer, additional, or different components than illustrated in FIG. 1. For example, the system 100 may include multiple servers 105, medical image databases 110, user devices 115, or a combination thereof.

The server 105, the medical image database 110, and the user device 115 communicate over one or more wired or wireless communication networks 120. Portions of the communication network 120 may be implemented using a wide area network, such as the Internet, a local area network, such as a Bluetooth™ network or Wi-Fi, and combinations or derivatives thereof. Alternatively or in addition, in some embodiments, components of the system 100 communicate directly as compared to through the communication network 120. Also, in some embodiments, the components of the system 100 communicate through one or more intermediary devices not illustrated in FIG. 1.

The server 105 is a computing device that may serve as a gateway for the medical image database 110. For example, in some embodiments, the server 105 may be a commercial picture archive and communication system (PACS) server. Alternatively, in some embodiments, the server 105 may be a server that communicates with a PACS server to access the medical image database 110.

As illustrated in FIG. 1, the server 105 includes an electronic processor 125, a memory 130, and a communication interface 135. The electronic processor 125, the memory 130, and the communication interface 135 communicate wirelessly, over one or more communication lines or buses, or a combination thereof. The server 105 may include additional components than those illustrated in FIG. 1 in various configurations. The server 105 may also perform additional functionality other than the functionality described herein. Also, the functionality described herein as being performed by the server 105 may be distributed among multiple devices, such as multiple servers included in a cloud service environment. In addition, in some embodiments, the user device 115 may be configured to perform all or a portion of the functionality described herein as being performed by the server 105.

The electronic processor 125 includes a microprocessor, an application-specific integrated circuit (ASIC), or another suitable electronic device for processing data. The memory 130 includes a non-transitory computer-readable medium, such as read-only memory (ROM), random access memory (RAM) (for example, dynamic RAM (DRAM), synchronous DRAM (SDRAM), and the like), electrically erasable programmable read-only memory (EEPROM), flash memory, a hard disk, a secure digital (SD) card, another suitable memory device, or a combination thereof. The electronic processor 125 is configured to access and execute computer-readable instructions ("software") stored in the memory 130. The software may include firmware, one or more applications, program data, filters, rules, one or more program modules, and other executable instructions. For example, the software may include instructions and associated data for performing a set of functions, including the methods described herein. For example, as illustrated in FIG. 1, the memory 130 may store a network architecture search (NAS) unit 145 and a segmentation network 150.

The communication interface 135 allows the server 105 to communicate with devices external to the server 105. For example, as illustrated in FIG. 1, the server 105 may communicate with the medical image database 110 through the communication interface 135. In particular, the communication interface 135 may include a port for receiving a wired connection to an external device (for example, a universal serial bus (USB) cable and the like), a transceiver for establishing a wireless connection to an external device (for example, over one or more communication networks 120, such as the Internet, local area network (LAN), a wide area network (WAN), and the like), or a combination thereof.

The server 105 may also communicate with the user device 115 via the communication network 120. Broadly, a user, such as a clinician, uses the user device 115 to interact with one or more of the NAS unit 145, the segmentation network 150, and the medical image database 110. Although not illustrated, the user device 115 may include similar components as the server 105 (an electronic processor, a memory, and a communication interface). In some embodiments, a memory of the user device 115 may store the segmentation network 150. Alternatively or in addition, the user device 115 may access the segmentation network 150 (or a portion thereof) stored in the memory 130 of the server 105 (or another device external to the user device 115) via the communication network 120.

The user device 115 may also include a human-machine interface 140. The human-machine interface 140 may include one or more input devices, one or more output devices, or a combination thereof. Accordingly, in some embodiments, the human-machine interface 140 allows a user to interact with (for example, provide input to and receive output from) the user device 115. For example, the human-machine interface 140 may include a keyboard, a cursor-control device (for example, a mouse), a touch screen, a scroll ball, a mechanical button, a display device (for example, a liquid crystal display (LCD)), a printer, a speaker, a microphone, or a combination thereof. As illustrated in FIG. 1, in some embodiments, the human-machine interface 140 includes a display device 160. The display device 160 may be included in the same housing as the user device 115 or may communicate with the user device 115 over one or more wired or wireless connections. For example, in some embodiments, the display device 160 is a touchscreen included in a laptop computer or a tablet computer. In other embodiments, the display device 160 is a monitor, a television, or a projector coupled to a terminal, desktop computer, or the like via one or more cables.

The medical image database 110 stores a plurality of medical images 165. As noted above, in some embodiments, the medical image database 110 is combined with the server 105. Alternatively or in addition, the medical images 165 may be stored within a plurality of databases, such as within a cloud service. Although not illustrated in FIG. 1, the medical image database 110 may include components similar to the server 105, such as an electronic processor, a memory, a communication interface, and the like. For example, the medical image database 110 may include a communication interface configured to communicate (for example, receive data and transmit data) over the communication network 120.

In some embodiments, the medical image database 110 stores additional data associated with the medical images 165, such as a classification associated with each of the medical images 165, clinician notes associated with one or more of the medical images 165 as described below in more detail, otherwise referred to as known truth data, or a combination thereof. Accordingly, in some embodiments, the medical image database 110 stores the training information used to train the classification models stored in the segmentation network 150. In other embodiments, this information (along with the associated image data) may be stored separate from the medical image database 110. The medical image database 110 may also store acquired or captured medical images that are not part of a training dataset.

The server 105 can be configured to use natural language processing to extract data from structured and unstructured medical documentation stored in the medical image database 110 (or other devices). Example data included in the medical documentation includes imaging reports, notes, diagnoses, findings, etc. A commercially available solution for such extraction activities includes the IBM Watson Health Patient Synopsis and Clinical Review.

Figure 2:
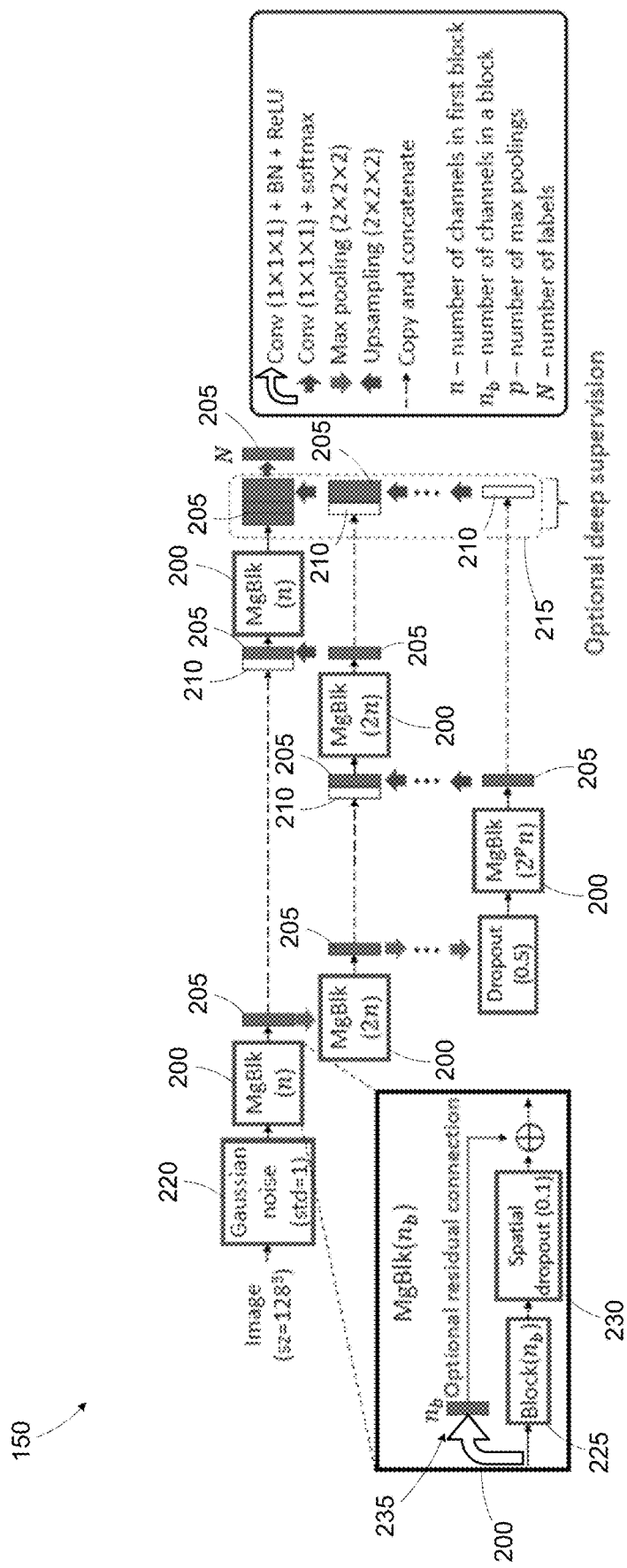
FIG. 2 is a diagram of the segmentation network generated by the system of FIG. 1.

As described in greater detail below, the NAS unit 145 generates the segmentation network 150. In general, the segmentation network 150 applies machine learning (artificial intelligence) to mimic cognitive functions, including but not limited to learning and problem solving. Machine learning generally refers to the ability of a computer program to learn without being explicitly programmed. In some embodiments, a computer program (sometimes referred to as a learning engine) is configured to construct a model (for example, one or more algorithms) based on example inputs. Supervised learning involves presenting a computer program with example inputs and their desired (actual) outputs, or truth data. The computer program is configured to learn a general rule (a model) that maps the inputs to the outputs in the training data. A computer program may ingest, parse, and understand data and progressively refine models for data analytics, including image analytics. Once trained, the computer system may be referred to as an intelligent system, an artificial intelligence (AI) system, a cognitive system, or the like. The segmentation network 150 may be "trained" using various machine learning techniques. In some embodiments, the segmentation network 150 may be trained using an image training dataset of brain structures FIG. 2 is a diagram of the segmentation network 150 generated by the system 100 FIG. 1, according to some embodiments. The segmentation network 150 includes MegaBlocks (MgBlk) 200, operation output boxes 205 (shaded), copied data boxes 210 (unshaded), a deep supervision block 215, and a Gaussian noise block 220. The segmentation network 150 uses a network architecture similar to U-Net and V-Net in some embodiments. The encoding and decoding paths for the segmentation network 150 are defined by the MegaBlocks 200. A number of channels in the segmentation network 150 is doubled after each max pooling and is halved after each upsampling. In some embodiments, the deep supervision block 215 is used to allow more direct backpropagation to the hidden layers for faster convergence and better accuracy is also an option. Each MegaBlock 200 includes a learnable operation block 225, a spatial dropout block 230, and a residual connection 235. In some embodiments, the spatial dropout block 230 and the residual connection 235 tend to reduce overfitting and enhance convergence.

In general, the NAS unit 145 selects hyperparameters for the segmentation network 150 to define the configurations of the MegaBlocks 200, the configuration of the operation blocks 225, and the connections between the MegaBlocks 200. In some embodiments, the hyperparameters include a number of feature channels of the first operation block 225, n, a number of maxpoolings, p, a deep supervision parameter indicting whether the deep supervision block 215 is used. In some embodiments, the hyperparameters for the MegaBlocks 200 include the configuration of the operation blocks 225 and a RC parameter indicating whether the residual connection 235 is used.

Figure 3:
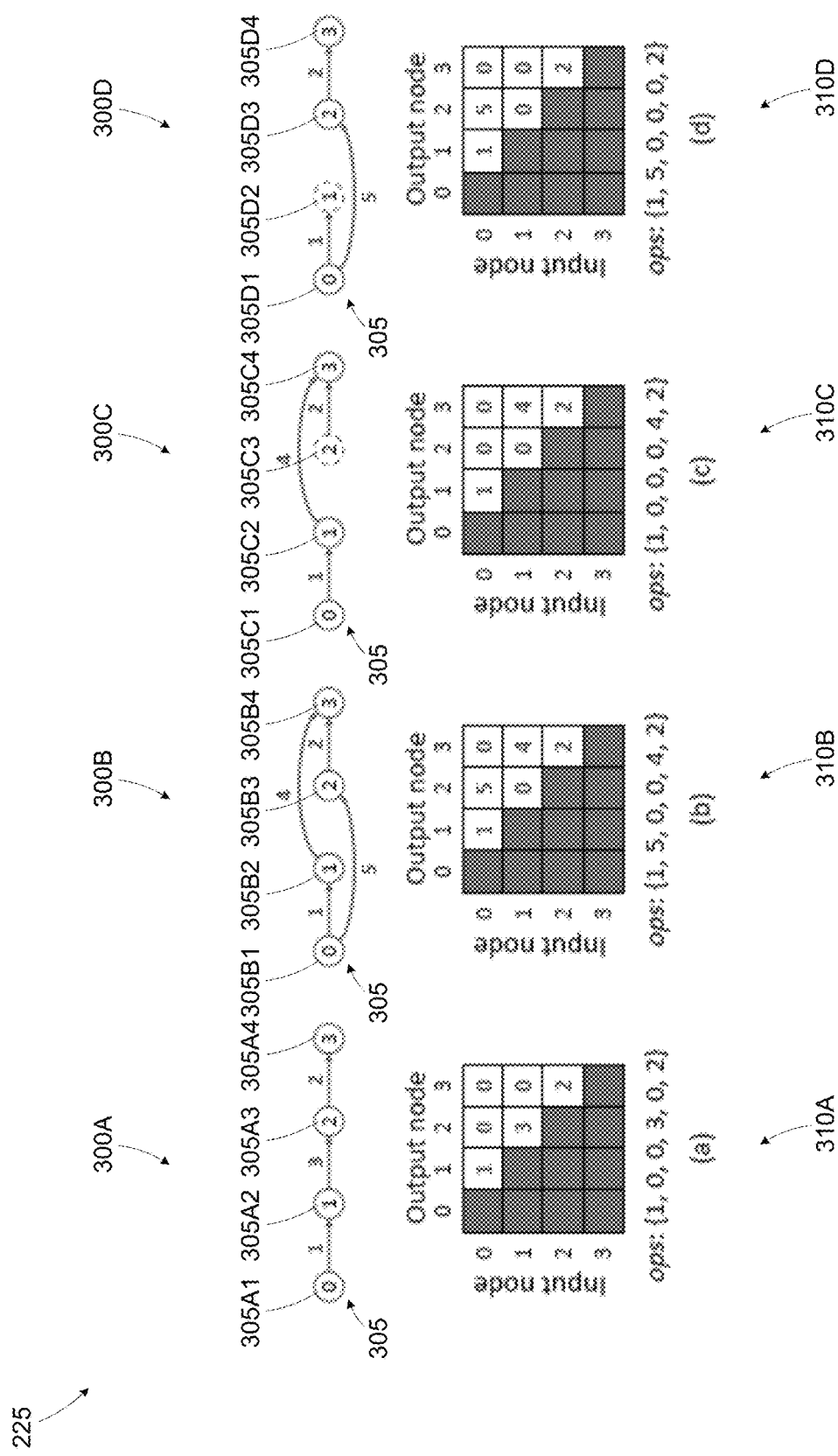
FIG. 3 is a diagram illustrating block structures employed in the segmentation network of FIG. 2.

FIG. 3 is a diagram illustrating operation blocks 225 employed in the segmentation network 150 of FIG. 2. For example, operation blocks 300A-300D with different configurations are illustrated. The operation blocks 225 include various deep-learning layers, such as convolution or batch normalization, whose pattern is repeatedly used in the segmentation network 150. The residual units of the ResNet are examples of operation blocks 225 that may be used. In some embodiments, the configuration of the operation blocks 225 is represented as a learnable directed acyclic graph including multiple nodes 305, where the nodes 305 are indexed by block number and position number. For example, the second node in the operation block 300A is designated as 305A2. Each node 305 represents a feature map (tensor) and each directed edge represents an operation (e.g. convolution). Example operations used by the operation blocks 225 are illustrated in Table 1, where Conv(k,d) represents a k×k×k convolution with dilation rate d (d=1 means no dilation). The operations include convolutions with different kernel sizes (k=1; 3; 5) and dilation rates (d=1; 2) for multi-scale features. In some embodiments, a skip connection operation, which allows better convergence, is also included. Outputs from different nodes are combined by summation. It was determined that combination by as concatenation, instead of summation, often led to out-of-memory (OOM) errors.

As described above, the number of nodes, b, in an operation block 225 is also a learnable hyperparameter that may be adjusted by the NAS unit 145. In some embodiments, to reduce the complexity of architecture search, all MegaBlocks 200 in the segmentation network 150 share the same operation matrix. The NAS unit 145 assigns the numbers of feature channels systematically based on the number of feature channels of the first operation block 225. Each convolution is followed by batch normalization and ReLU activation.

TABLE 1

| Node Operations | | | | | | |
|---|---|---|---|---|---|---|
| 0 | 1 | 2 | 3 | 4 | 5 | 6 |
| None | Conv(1, 1) | Conv(3, 1) | Conv(5, 1) | Conv(3, 2) | (Conv(5, 2) | Skip Connection |

As shown in FIG. 3, the configuration of an operation block 225 is represented as a directed acyclic graph 300A-300D with four nodes 305 (b=4). The acyclic graph may be represented as an upper triangular operation matrix 310A-310D that contains all operations in the operation block 225. The rows and columns of the operation matrix 310A-310D represent the input and output nodes, respectively, with nonzero elements representing operation numbers from Table 1. Each integer matrix element represents an operation in Table 1, and ops represents the corresponding set of operations. A source node is defined as a node that does not have parents and a sink is a node that does not have children. In an operation block 225, only the first node 305 (e.g., node 305A1) can be a source and the last node 305 (e.g., node 305A4) can be a sink, as they are connected to other MegaBlocks 200. In the matrix representation, a source and a sink can be easily identified as the column and the row with all zeros. A network cannot be built if there are sources or sinks as the intermediate nodes 305 (e.g., nodes 305A2, 305A3 in operation block 305A). The acyclic graph 300A represents a simple block configuration represented by a shifted diagonal matrix. The acyclic graph 300B represents a more complicated block configuration with multiple nodal inputs and outputs. The acyclic graph 300C represents an illegal block configuration with node 2 as a source. The acyclic graph 300D represents an illegal block configuration with node 1 as a sink.

Figure 4:
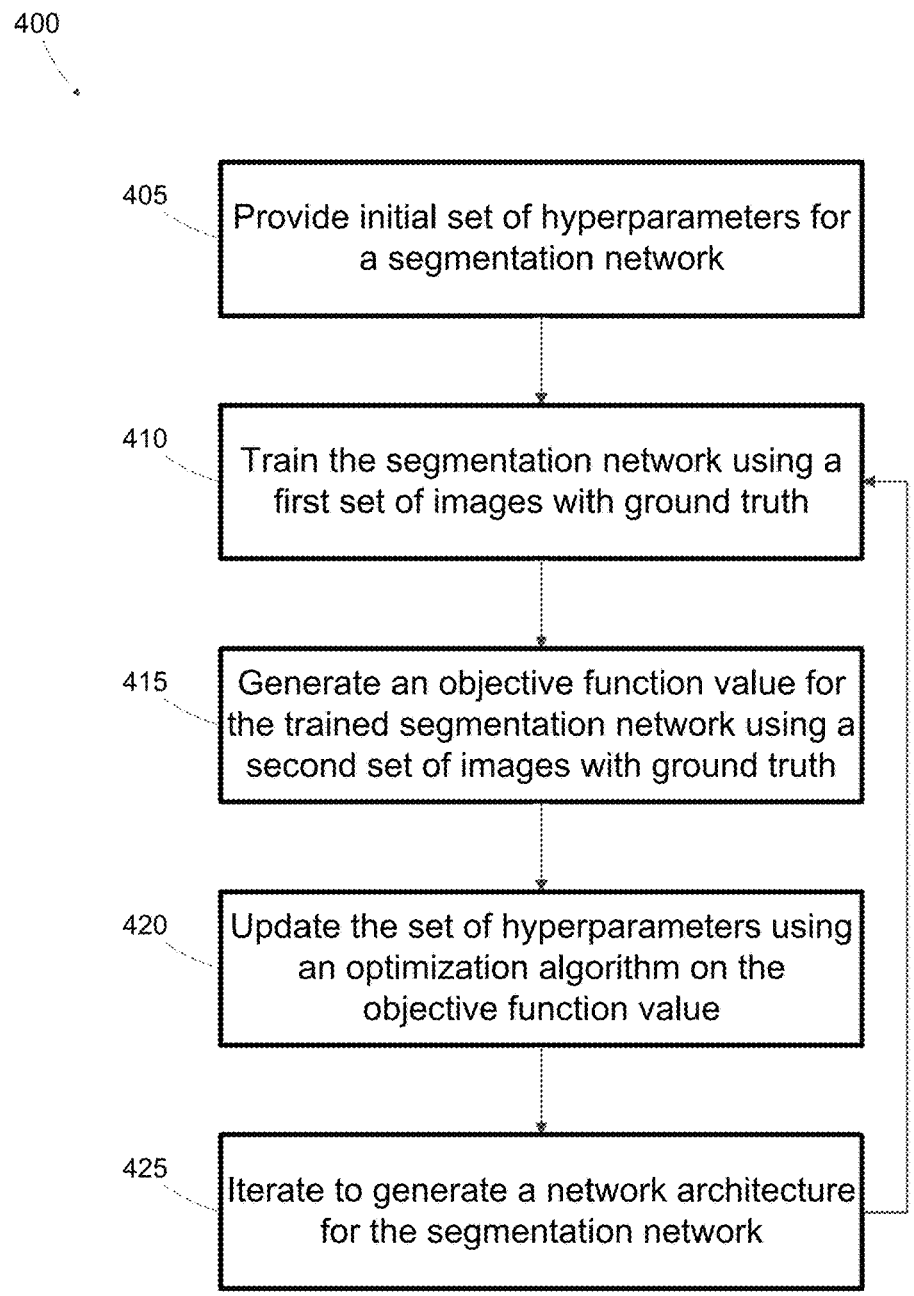
FIG. 4 is a flowchart illustrating an example method for generating a segmentation network performed by the system of FIG. 1.

FIG. 4 is a flowchart illustrating an example method 400 for generating a segmentation network performed by the system of FIG. 1. In method block 405, the NAS unit 145 provides a set of hyperparameters to construct an initial segmentation network. In general, the hyperparameters defining operations for a set of block structures and connections between the block structures.

Table 2 provides an example list of learnable hyperparameters and their upper and lower bounds that may be employed by the NAS unit 145. As denoted in Table 2, the effective set of integers of each half-open interval [a, b) is {a, . . . , b−1). For bounds [0, 2), {0, 1} represent {Disable, Enable}. The upper bound of nodes (b) determines the number of block-operation hyperparameters (ops) required. For example, an operation block 225 with bounds [2, 5) require six ops to fill a 4×4 upper triangular matrix. Scalars in bold type are fixed. For SegNAS$_4$, ops of {2, 0, 2} represent two cascaded Conv(3, 1) in Table 1.

TABLE 2

| | Learnable Hyperparameters | | | | | |
|---|---|---|---|---|---|---|
| | Block Connecting Hyperparameters | | | | Block Structures | |
| | n | P | sup | res | nodes | ops |
| SegNAS$_{11}$ | [8, 33) | [2, 6) | [0, 2) | [0, 2) | [2,5) | [0, 7)(6×) |
| SegNAS$_4$ | [8, 33) | [2, 6) | [0, 2) | [0, 2) | 3 | {2, 0, 2} |
| SegNAS$_7$ | 16 | 4 | 0 | 1 | [2, 5) | [0, 7)(6×) |

SegNAS$_{11}$ optimizes both block structures and their connections. SegNAS$_4$ optimizes only the block-connecting hyperparameters with a fixed simple block structure. SegNAS$_7$ optimizes only the block structures with fixed block-connecting hyperparameters inferred from the V-Net. Note that the subscripts indicate the number of hyperparameters to be optimized.

In method block 410, the NAS unit 145 trains the segmentation network 150 using a first set of images with ground truth from the medical image database 110. In some embodiments, the NAS unit 145 employs image augmentation with rotation (axial, ±30°), shifting (±20%), and scaling ([0.8, 1.2]). In some embodiments, each image has an 80% chance to be transformed in training. In some embodiments, the optimizer Nadam is used for fast convergence with the learning rate as $10^{-3}$. In some embodiments, the exponential logarithmic loss with Dice loss and cross-entropy is used.

In method block 415, the NAS unit 145 generates an objective function value for the trained segmentation network 150 using a second set of images having ground truth from the medical image database 110. The first and second sets of images do not overlap, so the images used for evaluation are different than the images used for training.

In method block 420, the NAS unit 145 updates the set of hyperparameters by performing an optimization algorithm on the objective function value. In some embodiments, the optimization algorithm is a derivative-free optimization algorithm. Due to the large number of hyperparameter combinations (e.g., >141 million when the maximum number of nodes, b, is four) and the fact that each selected hyperparameter combination requires training and evaluation with images from the medical image database 110, brute force search is prohibitive.

In method block 425, the NAS unit 145 iterates the training of the segmentation network 150 in method block 410, the generating of the objective function in method block 415, and the updating of the set of hyperparameters in method block 420 to generate a network architecture for the segmentation network.

The NAS unit 145 controls the iteration in method block 425 using nonlinear optimization. Various optimization algorithms may be used for derivative-free global optimization. In some embodiments, continuous relaxation is used to remove the integrality constraint of each parameter. In general, it is less optimal to compute gradients of an objective function that is intrinsically discrete and multiple local minima can be expected.

If $x \in R^{n_h}$ is defined as a vector of $n_h$ hyperparameters after continuous relaxation, the function $\lfloor x \rfloor$ (floor of x) is used to construct the network architecture. As a result, the objective function is a discontinuous function in a bounded continuous search space that can be better handled by a derivative-free global optimization. In some embodiments, the objective function $f=-\ln$ (Dice) is used, where Dice is the validation Dice coefficient. In some embodiments, the derivative-free global optimization algorithm referred to as controlled random search (CRS) is used. CRS starts with a population of sample points ($\gg n_h$) which are gradually evolved by an algorithm that resembles a randomized Nelder-Mead algorithm. In some embodiments, each search stops after 300 iterations.

During the search the NAS unit 145 handles exception issues. In some embodiments, the NAS unit 145 identifies illegal block configurations, such as the acyclic graphs 300C, 300D described above. In some embodiments, the NAS unit 145 identifies OOM errors during training. For illegal block configurations and OOM conditions, the NAS unit 145 assigns an objective function value of $\lfloor \max f \rfloor$ (e.g., 10 by clipping the minimum value of Dice as $10^{-4}$). This maximum objective function value informs the optimization algorithm that these situations are worse than having the worst segmentation. Secondly, as multiple x contribute to the same $\lfloor x \rfloor$, the NAS unit 145 stores each $\lfloor x \rfloor$ and the corresponding $f$ to avoid unnecessary training for better efficiency.

After completion of the segmentation network 150 in method block 425, the segmentation network 150 may be used to generate segmentation data for images without known truth data. For example, the segmentation network 150 may be used on a third set of images to generate segmentation data for the third set of images.

Validation of the network architecture search framework was performed on 3D brain magnetic resonance image segmentation. A dataset of 43 T1-weighted MP-RAGE images from different patients was neuroanatomically labeled to provide the training, validation, and testing samples. They were manually segmented by highly trained experts, and each had 19 semantic labels of brain structures. Each image was resampled to isotropic spacing using the minimum spacing, zero padded, and resized to 128×128×128. Three sets of dataset splits were generated by shuffling and splitting the dataset in the medical image database 110, with 50% for training, 20% for validation, and 30% for testing in each set.

The training and validation data were used during architecture search to provide the training data and the validation Dice coefficients for the objective function. The testing data were only used to test the optimal networks after search. The three framework variations shown in Table 2 were tested. Experiments were performed on the 3D U-Net and V-Net for comparison. The same training strategy and dataset splits were used in all experiments.

In all tests, there were more fluctuations at the early iterations as the optimization algorithm searched for the global optimum, and the evolutions gradually converged. SegNAS$_{11}$ had the least effective number of Dice coefficients (139) as its larger number of hyperparameter combinations led to more illegal block structures and OOM errors. In contrast, SegNAS$_4$ had the most effective number (272). Searching optimal block structures (SegNAS$_{11}$ and SegNAS$_7$) led to larger fluctuations, and searching only block-connecting hyperparameters (SegNAS$_4$) gave faster convergence.

Table 3 shows the average results from all three dataset splits and the optimal hyperparameters of a dataset split. The best results are in bold and the fixed hyperparameters are in italics. The testing Dice coefficients are shown. GPU days are the number of searching days multiplied by the number of GPUs (three) used. Strikethrough ops of SegNAS$_{11}$ were not used to form the network because of the number of nodes (three).

TABLE 3

Validation Results

| | Average Results (mean ± std) | | | Optimal Hyperparameters of Search | | | | | |
|---|---|---|---|---|---|---|---|---|---|
| | Dice (%) | Parameters (M) | GPU Days | n | p | sup | res | nodes | ops |
| SegNAS$_{11}$ | 81.7 ± 0.3 | 9.7 ± 4.1 | 6.6 ± 0.6 | 26 | 3 | 0 | 1 | 3 | {2,2,3, ~~6,3,3~~} |
| SegNAS$_4$ | 81.0 ± 0.5 | 3.2 ± 0.6 | 3.6 ± 0.1 | 21 | 3 | 2 | 0 | *3* | {*2,0,2*} |
| SegNAS$_7$ | 77.7 ± 1.0 | 30.1 ± 5.4 | 8.2 ± 0.4 | *16* | *4* | *0* | *1* | 4 | {6,2,3,0, 4,3} |

TABLE 3-continued

Validation Results

| | Average Results (mean ± std) | | | Optimal Hyperparameters of Search | | | | | |
|---|---|---|---|---|---|---|---|---|---|
| | Dice (%) | Parameters (M) | GPU Days | n | p | sup | res | nodes | ops |
| 3D U-Net | OOM | 19.1 ± 0.0 | — | | | | | — | |
| V-Net | 47.9 ± 7.4 | 71.1 ± 0.0 | — | | | | | — | |

The V-Net gave the lowest testing Dice coefficients and the largest model. SegNAS$_{11}$ had the best segmentation performance while SegNAS$_4$ produced the smallest models with fewest GPU days for comparably good performance. Among the variations, SegNAS$_7$ had the lowest Dice coefficients, largest models, and most GPU days. The 3D U-Net resulted in OOM error and produced a larger network than SegNAS$_{11}$ and SegNAS$_4$. Using three GPUs, each search required less than three days to complete.

Searching the block-connecting hyperparameters n, p, sup, and res are more effective with simple block structures such as that of SegNAS$_4$. Searching also the block structures can improve segmentation accuracy with increased searching time and likely larger models. Searching only the block structures can lead to larger models depending on the fixed n, p values and is not as effective. The 3D U-Net generated an OOM error because of its relatively large memory footprint (e.g. tensors of 128×128×128 with 64 feature channels). The segmentations of the V-Net were inaccurate probably because of insufficient training data given the number of network parameters. When the amount of training data was increased from 50% to 70%, the testing Dice coefficients of the V-Net increased to 68.1±2.3%. These results demonstrate the advantages of the NAS techniques described herein as the OOM error is explicitly considered and the relation between the network size and the available data is intrinsically handled.

By representing the network architecture as learnable connecting block structures and identifying the hyperparameters to be optimized, the search is formulated as a global optimization problem with continuous relaxation. Using the NAS techniques described herein greatly reduces the time needed to generate network architectures compared to previous manual network configuration. The automatic handling of exceptions, such as illegal block configurations and OOM errors increases the robustness of the NAS.

Various features and advantages of the embodiments described herein are set forth in the following claims.

What is claimed is:

1. A method for automatic generation of at least one segmentation network, comprising:
    providing an initial set of hyperparameters to construct a segmentation network, the hyperparameters defining operations for a set of block structures and connections between the block structures;
    training the segmentation network using a first set of images with ground truth;
    generating an objective function value by an objective function for the trained segmentation network using a second set of images having ground truth;
    updating the set of hyperparameters by performing a derivative-free optimization algorithm on the objective function to construct an updated segmentation network; and
    iterating the training of the segmentation network, the generating of the objective function value, and the updating of the set of hyperparameters for the updated segmentation network to generate a network architecture for the segmentation network.

2. The method of claim 1, further comprising terminating the iterating responsive to a number of iterations meeting a predetermined threshold.

3. The method of claim 1, further comprising terminating the iterating responsive to obtaining a convergence.

4. The method of claim 1, comprising setting the objective function value to a predetermined value responsive to identifying an out-of-memory condition during the training of the segmentation network.

5. The method of claim 1, comprising:
    setting the objective function value to a predetermined value responsive to identifying an illegal configuration of a block structure for a particular set of hyperparameters; and
    suppressing the training of the segmentation network for the particular set of hyperparameters.

6. The method of claim 5, wherein the illegal configuration comprises a node other than a first node in a sequence of nodes being designated as a source node.

7. The method of claim 5, wherein the illegal configuration comprises a node other than a last node in a sequence of nodes being designated as a sink node.

8. The method of claim 1, wherein each block structure is represented as a directed acyclic graph with nodes as tensors and edges as deep learning operations which operate on the tensors, and the hyperparameters include node operations for the repetitive block structures.

9. The method of claim 8, wherein the hyperparameters for defining connections between the block structures comprise a number of feature channels, a maxpoolings parameter, a skip connections parameter, and a deep supervision parameter.

10. The method of claim 1, wherein a mega block structure is associated with each of the block structures, and the hyperparameters comprise a spatial dropout parameter and a residual connection parameter.

11. The method of claim 1, wherein the first and second sets of images comprise 3D medical images.

12. The method of claim 1, comprising employing the segmentation network on a third set of images to generate segmentation data for the third set of images.

13. A system for generating a network architecture, the system comprising:
    an electronic processor; and
    memory storing instructions that, when executed by the electronic processor, cause the system to:
    provide an initial set of hyperparameters to construct a segmentation network, the hyperparameters defining operations for a set of block structures and connections between the block structures;
    train the segmentation network using a first set of images with ground truth;
    generate an objective function value by an objective function for the trained segmentation network using a second set of images having ground truth;
    update the set of hyperparameters by performing a derivative-free optimization algorithm on the objective function to construct an updated segmentation network; and iterate the training of the segmentation network, the generating of the objective function value, and the updating of the set of hyperparameters for the updated segmentation network to generate a network architecture for the segmentation network.

14. The system according to claim 13, wherein the memory further stores instructions that, when executed by the electronic processor, cause the system to:
set the objective function value to a predetermined value responsive to identifying an out-of-memory condition during the training of the segmentation network.

15. The system according to claim 13, wherein the memory further stores instructions that, when executed by the electronic processor, cause the system to:
set the objective function value to a predetermined value responsive to identifying an illegal configuration of a block structure for a particular set of hyperparameters; and
suppress the training of the segmentation network for the particular set of hyperparameters.

16. The system according to claim 13, wherein the illegal configuration comprises one of a node other than a first node in a sequence of nodes being designated as at least one of a source node or a node other than a last node in a sequence of nodes being designated as a sink node.

17. A non-transitory computer-readable medium storing instructions that, when executed by an electronic processor, perform a set of functions, the set of functions comprising:
providing an initial set of hyperparameters to construct a segmentation network, the hyperparameters defining operations for a set of block structures and connections between the block structures;
training the segmentation network using a first set of images with ground truth;
generating an objective function value by an objective function for the trained segmentation network using a second set of images having ground truth;
updating the set of hyperparameters by performing a derivative-free optimization algorithm on the objective function to construct an updated segmentation network; and
iterating the training of the segmentation network, the generating of the objective function value, and the updating of the set of hyperparameters for the updated segmentation network to generate a network architecture for the segmentation network.

18. The non-transitory computer readable medium according to claim 17, wherein the set of functions further comprises:
setting the objective function value to a predetermined value responsive to identifying an out-of-memory condition during the training of the segmentation network.

19. The non-transitory computer readable medium according to claim 17, wherein the set of functions further comprises:
setting the objective function value to a predetermined value responsive to identifying an illegal configuration of a block structure for a particular set of hyperparameters; and
suppressing the training of the segmentation network for the particular set of hyperparameters.

20. The non-transitory computer readable medium according to claim 19, wherein the illegal configuration comprises one of a node other than a first node in a sequence of nodes being designated as a source node or a node other than a last node in a sequence of nodes being designated as a sink node.

* * * * *